(12) United States Patent
Yao et al.

(10) Patent No.: US 9,933,879 B2
(45) Date of Patent: Apr. 3, 2018

(54) RECONFIGURABLE CIRCUIT TOPOLOGY FOR BOTH SELF-CAPACITANCE AND MUTUAL CAPACITANCE SENSING

(71) Applicant: Apple Inc., Cupertino, CA (US)

(72) Inventors: Weijun Yao, San Jose, CA (US);
Kingsuk Brahma, San Francisco, CA (US); Taif A. Syed, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/089,418

(22) Filed: Nov. 25, 2013

(65) Prior Publication Data
US 2015/0145802 A1    May 28, 2015

(51) Int. Cl.
G06F 3/041     (2006.01)
G06F 3/044     (2006.01)

(52) U.S. Cl.
CPC .......... G06F 3/0416 (2013.01); G06F 3/044 (2013.01); *G06F 2203/04106* (2013.01)

(58) Field of Classification Search
CPC ......... G06F 2203/04107; G06F 3/0412; G06F 3/0416; G06F 2203/04104; G06F 2203/04106; G06F 3/041–3/044; G06F 3/047; G01R 27/2605
See application file for complete search history.

(56) References Cited

U.S. PATENT DOCUMENTS

| | | |
|---|---|---|
| 4,603,231 A | 7/1986 | Reiffel et al. |
| 5,392,058 A | 2/1995 | Tagawa |
| 5,402,151 A | 3/1995 | Duwaer |
| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| | | |
|---|---|---|
| CN | 101393502 A | 3/2009 |
| FR | 2 949 007 | 2/2011 |

(Continued)

OTHER PUBLICATIONS

Final Office Action dated Oct. 14, 2014, for U.S. Appl. No. 13/460,652, filed Apr. 30, 2012, 16 pages.

(Continued)

*Primary Examiner* — Roberto Flores
(74) *Attorney, Agent, or Firm* — Morrison & Foerster, LLP

(57) ABSTRACT

A touch sensor panel configured to switch between a mutual capacitance touch sensing architecture and a self-capacitance touch sensing architecture is provided. The touch sensor panel includes circuitry that can switch the configuration of touch electrodes to act as either drive lines in a mutual capacitance configuration or as sense electrodes in a self-capacitance configuration. The touch sensor panel also includes circuitry that can switch the configuration of touch electrodes to act as either sense lines in a mutual capacitance configuration or as sense electrode in a self-capacitance configuration. By splitting a self-capacitance touch mode into a drive line self-capacitive mode and sense line self-capacitive mode, the touch sensor panel is able to reuse components thus requiring less space, weight and power.

27 Claims, 11 Drawing Sheets

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,137,427 A | 10/2000 | Binstead | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,335,642 B1 | 1/2002 | Hiroshima et al. | |
| 6,650,157 B2 | 11/2003 | Amick et al. | |
| 6,690,387 B2 | 2/2004 | Zimmerman et al. | |
| 7,015,894 B2 | 3/2006 | Morohoshi | |
| 7,084,643 B2 | 8/2006 | Howard et al. | |
| 7,184,064 B2 | 2/2007 | Zimmerman et al. | |
| 7,315,793 B2 | 1/2008 | Jean | |
| 7,663,607 B2 | 2/2010 | Hotelling et al. | |
| 8,149,002 B2 | 4/2012 | Ossart et al. | |
| 8,479,122 B2 | 7/2013 | Hotelling et al. | |
| 8,770,033 B2 | 7/2014 | Roziere | |
| 8,913,021 B2 | 12/2014 | Elias et al. | |
| 8,933,710 B2 | 1/2015 | Blondin et al. | |
| 9,086,768 B2 | 7/2015 | Elias et al. | |
| 9,201,547 B2 | 12/2015 | Elias et al. | |
| 9,268,431 B2 | 2/2016 | King et al. | |
| 9,323,398 B2 | 4/2016 | Bernstein et al. | |
| 9,569,053 B2 | 2/2017 | Elias et al. | |
| 2002/0121146 A1 | 9/2002 | Manaresi et al. | |
| 2004/0217945 A1 | 11/2004 | Miyamoto et al. | |
| 2004/0239650 A1 | 12/2004 | Mackey | |
| 2006/0022682 A1* | 2/2006 | Nakamura | G01D 5/24 324/681 |
| 2006/0026521 A1 | 2/2006 | Hotelling et al. | |
| 2006/0071913 A1 | 4/2006 | Wang et al. | |
| 2006/0097992 A1* | 5/2006 | Gitzinger | G06F 3/044 345/173 |
| 2006/0197749 A1 | 9/2006 | Popovich | |
| 2006/0197753 A1 | 9/2006 | Hotelling | |
| 2007/0074913 A1 | 4/2007 | Geaghan et al. | |
| 2007/0109274 A1 | 5/2007 | Reynolds | |
| 2007/0152977 A1 | 7/2007 | Ng et al. | |
| 2008/0007533 A1 | 1/2008 | Hotelling | |
| 2008/0007543 A1 | 1/2008 | D'Souza | |
| 2008/0012835 A1 | 1/2008 | Rimon et al. | |
| 2008/0041639 A1 | 2/2008 | Westerman et al. | |
| 2008/0042660 A1 | 2/2008 | Ely et al. | |
| 2008/0062148 A1 | 3/2008 | Hotelling et al. | |
| 2008/0122798 A1 | 5/2008 | Koshiyama et al. | |
| 2008/0143683 A1 | 6/2008 | Hotelling | |
| 2008/0158172 A1 | 7/2008 | Hotelling et al. | |
| 2008/0158174 A1 | 7/2008 | Land et al. | |
| 2008/0158176 A1 | 7/2008 | Land et al. | |
| 2008/0174321 A1 | 7/2008 | Kang et al. | |
| 2008/0231292 A1 | 9/2008 | Ossart et al. | |
| 2008/0309623 A1 | 12/2008 | Hotelling et al. | |
| 2008/0309632 A1 | 12/2008 | Westerman et al. | |
| 2009/0009483 A1 | 1/2009 | Hotelling et al. | |
| 2009/0009485 A1* | 1/2009 | Bytheway | G06F 3/044 345/174 |
| 2009/0045823 A1 | 2/2009 | Tasher et al. | |
| 2009/0127005 A1 | 5/2009 | Zachut et al. | |
| 2009/0128515 A1 | 5/2009 | Bytheway | |
| 2009/0167325 A1 | 7/2009 | Geaghan | |
| 2009/0174675 A1 | 7/2009 | Gillespie et al. | |
| 2009/0219255 A1 | 9/2009 | Woolley et al. | |
| 2009/0234207 A1 | 9/2009 | Rantala | |
| 2009/0251434 A1* | 10/2009 | Rimon | G06F 1/30 345/173 |
| 2009/0251439 A1 | 10/2009 | Westerman et al. | |
| 2009/0289914 A1 | 11/2009 | Cho | |
| 2009/0309851 A1 | 12/2009 | Bernstein | |
| 2010/0026656 A1 | 2/2010 | Hotelling et al. | |
| 2010/0071459 A1 | 3/2010 | Kamm et al. | |
| 2010/0097077 A1* | 4/2010 | Philipp | G06F 3/044 324/678 |
| 2010/0105443 A1 | 4/2010 | Vaisanen | |
| 2010/0110038 A1 | 5/2010 | Mo et al. | |
| 2010/0110040 A1 | 5/2010 | Kim et al. | |
| 2010/0149126 A1 | 6/2010 | Futter | |
| 2010/0241956 A1 | 9/2010 | Matsuda et al. | |
| 2010/0252335 A1* | 10/2010 | Orsley | G06F 3/044 178/18.03 |
| 2010/0253638 A1 | 10/2010 | Yousefpor et al. | |
| 2010/0321333 A1 | 12/2010 | Oda et al. | |
| 2010/0328262 A1 | 12/2010 | Huang et al. | |
| 2011/0007021 A1 | 1/2011 | Bernstein | |
| 2011/0025629 A1 | 2/2011 | Grivna et al. | |
| 2011/0050585 A1 | 3/2011 | Hotelling et al. | |
| 2011/0050610 A1 | 3/2011 | Pearce et al. | |
| 2011/0061949 A1 | 3/2011 | Krah et al. | |
| 2011/0063247 A1 | 3/2011 | Min | |
| 2011/0084929 A1 | 4/2011 | Chang et al. | |
| 2011/0115729 A1 | 5/2011 | Kremin et al. | |
| 2011/0115742 A1 | 5/2011 | Sobel et al. | |
| 2011/0157069 A1 | 6/2011 | Zhuang et al. | |
| 2011/0234523 A1* | 9/2011 | Chang et al. | 345/173 |
| 2011/0273395 A1 | 11/2011 | Chung | |
| 2011/0273399 A1 | 11/2011 | Lee | |
| 2012/0007831 A1 | 1/2012 | Chang et al. | |
| 2012/0013399 A1 | 1/2012 | Huang | |
| 2012/0043971 A1 | 2/2012 | Maharyta | |
| 2012/0050180 A1 | 3/2012 | King et al. | |
| 2012/0050214 A1* | 3/2012 | Kremin | G06F 3/0418 345/174 |
| 2012/0050333 A1 | 3/2012 | Bernstein | |
| 2012/0092288 A1 | 4/2012 | Wadia | |
| 2012/0162088 A1 | 6/2012 | Van Lieshout et al. | |
| 2012/0169660 A1* | 7/2012 | Seo | G06F 1/3262 345/174 |
| 2012/0176179 A1 | 7/2012 | Harders et al. | |
| 2012/0182251 A1 | 7/2012 | Krah | |
| 2012/0187965 A1 | 7/2012 | Roziere | |
| 2012/0188200 A1 | 7/2012 | Roziere | |
| 2012/0262222 A1 | 10/2012 | Schwartz et al. | |
| 2012/0287077 A1 | 11/2012 | Pant et al. | |
| 2013/0038863 A1 | 2/2013 | Fresquet | |
| 2013/0120052 A1* | 5/2013 | Siska | H03K 17/962 327/517 |
| 2013/0285971 A1 | 10/2013 | Elias et al. | |
| 2013/0285972 A1* | 10/2013 | Elias et al. | 345/174 |
| 2013/0285973 A1* | 10/2013 | Elias et al. | 345/174 |
| 2013/0314109 A1 | 11/2013 | Kremin et al. | |
| 2014/0022188 A1* | 1/2014 | Ahn | G06F 3/0416 345/173 |
| 2014/0078096 A1* | 3/2014 | Tan | G01R 27/2605 345/174 |
| 2014/0085246 A1* | 3/2014 | Shahparnia | 345/174 |
| 2014/0145732 A1 | 5/2014 | Blondin et al. | |
| 2014/0145997 A1* | 5/2014 | Tiruvuru | G06F 3/0416 345/174 |
| 2014/0146006 A1 | 5/2014 | Luong | |
| 2014/0240280 A1* | 8/2014 | Ekici | G06F 3/044 345/174 |
| 2014/0267165 A1 | 9/2014 | Roziere | |
| 2014/0360854 A1 | 12/2014 | Roziere | |
| 2015/0002176 A1* | 1/2015 | Kwon, II | G06F 3/0416 324/679 |
| 2015/0015531 A1* | 1/2015 | Kim | G06F 3/04883 345/174 |
| 2015/0324062 A1 | 11/2015 | Elias et al. | |
| 2016/0209982 A1 | 7/2016 | Bernstein et al. | |
| 2016/0259474 A1 | 9/2016 | King et al. | |
| 2017/0003816 A1 | 1/2017 | Bernstein et al. | |
| 2017/0147109 A1 | 5/2017 | Elias et al. | |

FOREIGN PATENT DOCUMENTS

| | | |
|---|---|---|
| JP | 2000-163031 A | 6/2000 |
| JP | 2002-342033 A | 11/2002 |
| JP | 2008-117371 | 5/2008 |
| KR | 10-2009-0017557 | 2/2009 |
| WO | WO-2005/114369 A2 | 12/2005 |
| WO | WO-2005/114369 A3 | 12/2005 |
| WO | WO-2007/130771 A2 | 11/2007 |
| WO | WO-2008/121411 | 10/2008 |

(56) References Cited

FOREIGN PATENT DOCUMENTS

| WO | WO-2009/023880 | | 2/2009 |
|---|---|---|---|
| WO | WO-2011/005977 | | 1/2011 |
| WO | WO-2011/137200 | A1 | 11/2011 |
| WO | WO-2012/027086 | A2 | 3/2012 |
| WO | WO-2013/165925 | A2 | 11/2013 |

OTHER PUBLICATIONS

Final Office Action dated Mar. 3, 2015, for U.S. Appl. No. 12/895,643, filed Sep. 30, 2010, 22 pages.
Notice of Allowance dated Mar. 16, 2015, for U.S. Appl. No. 13/460,620, filed Apr. 30, 2012, seven pages.
Non-Final Office Action dated Apr. 24, 2015, for U.S. Appl. No. 12/501,382, filed Jul. 10, 2009, 32 pages.
Notice of Allowance dated Apr. 13, 2015, for U.S. Appl. No. 13/460,652, filed Apr. 30, 2012, seven pages.
Final Office Action dated Aug. 14, 2014, for U.S. Appl. No. 13/460,620, filed Apr. 30, 2012, 17 pages.
Non-Final Office Action dated Feb. 25, 2014, for U.S. Appl. No. 13/460,652, filed Apr. 30, 2012, 14 pages.
Notice of Allowance dated Aug. 15, 2014, for U.S. Appl. No. 13/460,645, filed Apr. 30, 2012, seven pages.
International Search Report dated Dec. 17, 2013, for PCT Application No. PCT/US2013/038706, filed Apr. 29, 2013, eight pages.
Non-Final Office Action dated Dec. 24, 2013, for U.S. Appl. No. 13/460,645, filed Apr. 30, 2012, 25 pages.
Non-Final Office Action dated Jan. 30, 2014, for U.S. Appl. No. 13/460,620, filed Apr. 30, 2012, 14 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Cypress. (Apr. 21, 2010). "Cypress's New Hover Detection for TrueTouch™ Touchscreen Solution Indicates Where a Finger Will Touch as It Approaches Screen," Press Release by Cypress Semiconductor Corp., located at <http://www.cypress.com/?rID=42779>, last visited Sep. 28, 2010, two pages.
Final Office Action dated May 10, 2013, for U.S. Appl. No. 12/501,382, filed Jul. 10, 2009, 23 pages.
Final Office Action dated Aug. 19, 2013, for U.S. Appl. No. 12/895,643, filed Sep. 30, 2010, 18 pages.
Final Office Action dated Dec. 5, 2013, for U.S. Appl. No. 12/501,382, filed Jul. 10, 2009, 28 pages.
Final Office Action dated Aug. 1, 2014, for U.S. Appl. No. 12/501,382, filed Jul. 10, 2009, 42 pages.
International Search Report dated Apr. 20, 2011, for PCT Application No. PCT/US2010/041391, filed Jul. 8, 2010, six pages.
International Search Report dated Aug. 22, 2012, for PCT Application No. PCT/US2011/046814, filed Aug. 5, 2011, three pages.
Non-Final Office Action dated Oct. 4, 2012, for U.S. Appl. No. 12/501,382, filed Jul. 10, 2009, 20 pages.
Non-Final Office Action dated Mar. 29, 2013, for U.S. Appl. No. 12/895,643, filed Sep. 30, 2010, 16 pages.
Non-Final Office Action dated Aug. 15, 2014, for U.S. Appl. No. 12/895,643, filed Sep. 30, 2010, 19 pages.
U.S. Appl. No. 12/501,382, filed Jul. 10, 2009, by Bernstein et al.
European Search Report dated Jul. 20, 2015, for EP Application No. 15162455.8, three pages.
Notice of Allowance dated Aug. 5, 2015, for U.S. Appl. No. 13/460,620, filed Apr. 30, 2012, eight pages.
Notice of Allowance dated Oct. 6, 2015, for U.S. Appl. No. 12/895,643, filed Sep. 30, 2010, 8 pages.
Chinese Search Report dated May 23, 2016, for CN Application No. 201380022713.1, filed Apr. 29, 2013, with English translation, four pages.
Non-Final Office Action dated Feb. 26, 2016, for U.S. Appl. No. 14/788,642, filed Jun. 30, 2015, 16 pages.
Notice of Allowance dated Sep. 28, 2016, for U.S. Appl. No. 14/788,642, filed Jun. 30, 2015, eight pages.
Notice of Allowance dated Dec. 17, 2015, for U.S. Appl. No. 12/501,382, filed Jul. 10, 2009, five pages.
Non-Final Office Action dated Jun. 30, 2017, for U.S. Appl. No. 15/428,082, filed Feb. 8, 2017, 13 pages.
Non-Final Office Action dated Aug. 11, 2017, for U.S. Appl. No. 15/050,351, filed Feb. 22, 2016, 17 pages.
Non-Final Office Action dated Oct. 5, 2017, for U.S. Appl. No. 15/083,102, filed Mar. 28, 2016, 16 pages.
Non-Final Office Action dated Oct. 5, 2017, for U.S. Appl. No. 15/268,418, filed Sep. 16, 2016, 22 pages.

* cited by examiner

RECONFIGURABLE CIRCUIT TOPOLOGY FOR BOTH SELF-CAPACITANCE AND MUTUAL CAPACITANCE SENSING

FIELD OF THE DISCLOSURE

This relates generally to a touch sensor panel that can be switched between a mutual capacitance topology and a self-capacitance topology by re-using common components between the two architectures while at the same time minimizing parasitic noise caused by proximal electronics.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO). The lines are often arranged orthogonally on a substantially transparent substrate. Mutual capacitance touch sensor panels not only have the ability to detect touch events on the touch sensor panels, but also have the ability to detect proximity events in which an object is not touching the panel but is in close proximity to the panel. However, mutual capacitance touch sensor panels are constrained in their ability to sense proximity events, and thus only provide proximity detection over a limited range of distances from the touch sensor panel.

SUMMARY OF THE DISCLOSURE

This relates to a touch sensor panel configured to switch its configuration between a mutual capacitance touch sensing mode and a self-capacitance touch sensing mode. The panel can be configured to include circuitry that is capable of switching a plurality of touch electrodes between being used as drive lines in a mutual capacitance near field configuration and being used as sense electrodes in a self-capacitance configuration. Furthermore the panel can be configured to divide the self-capacitance configuration into two steps, wherein during the first step the drive lines act as sense electrodes and during the second step the sense lines act as sense electrodes. In this way, circuitry used to configure the sense electrodes can be re-used between the two steps.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a touch sensor panel that can switch its configuration from a mutual capacitance touch sensor panel to a self-capacitance touch sensor panel in such a way so as to minimize the number of electrical components needed, while at the same time minimizing the amount of parasitic noise from proximal electronics that is coupled into the touch sensor panel.

Although examples disclosed herein may be described and illustrated herein in terms of mutual capacitance and self-capacitance touch sensor panels, it should be understood that the examples are not so limited, but are additionally applicable to any capacitive touch sensor panel in which common electrical components can be used between different capacitive modes. Additionally, although examples disclosed herein may be described and illustrated in terms of driven shielding being applied to one or more of a sense electrode or drive electrode, it should be understood that the examples are not so limited, but may be additionally applicable to any part of a touch input device which contributes parasitic capacitance to sense detection. Furthermore, although examples disclosed herein relate to a method of switching a circuit topology on a touch sensor panel, it should be understood that the examples are not so limited, but may be additionally applicable to any capacitive touch sensor device such as a capacitive trackpad.

Figure 1:
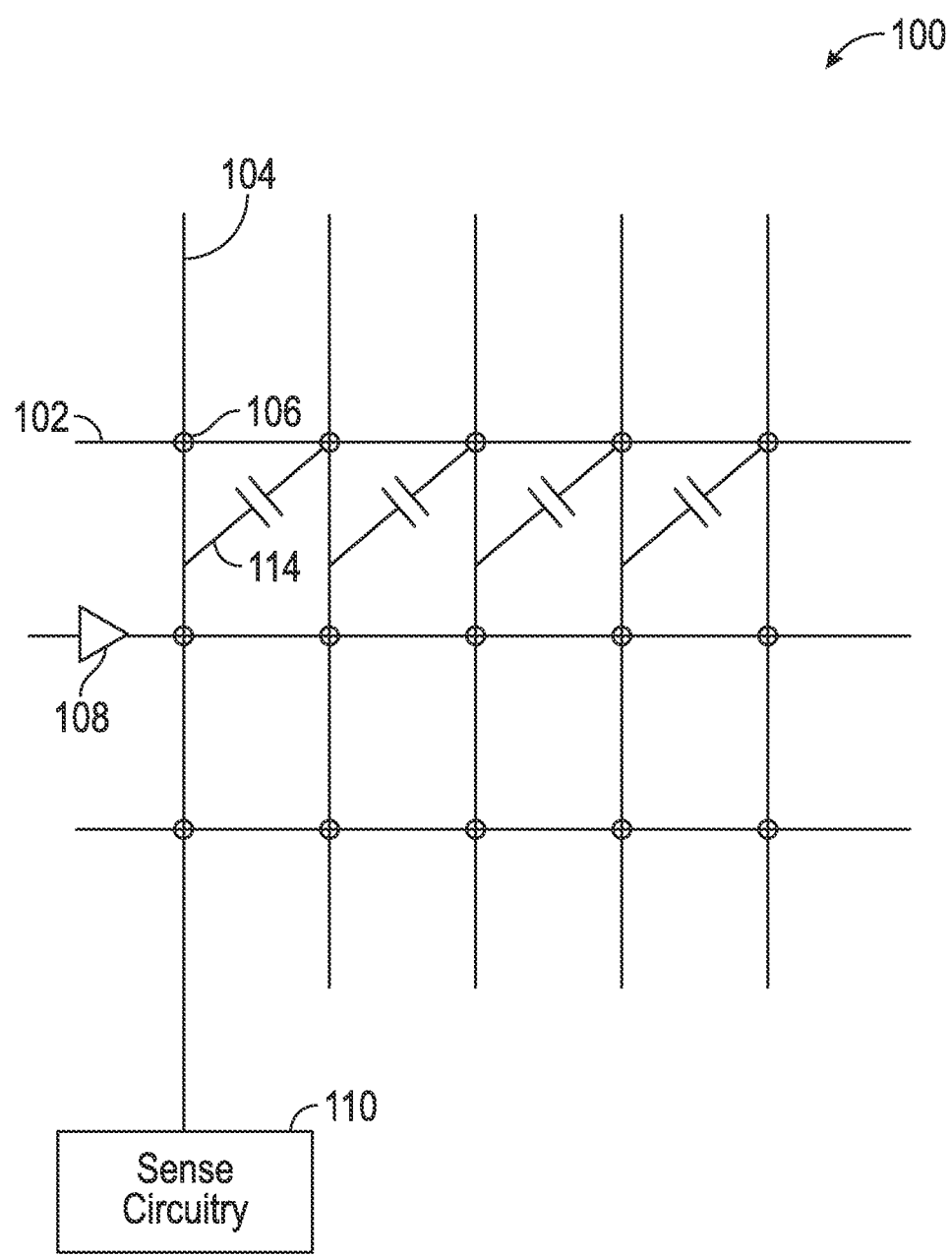
FIG. 1 illustrates an exemplary mutual capacitance touch sensor circuit according to examples of the disclosure.

FIG. 1 illustrates an exemplary touch sensor panel 100 according to some examples of the disclosure. Touch sensor panel 100 can include an array of touch nodes 106 that can be formed by a two-layer electrode structure separated by a dielectric material, although in other examples the electrodes can be formed on the same layer. One layer of electrodes can include a plurality of drive lines 102 positioned perpendicular to another layer of electrodes comprising a plurality of sense lines 104, with each of the nodes 106 having an associated mutual capacitance 114 (also referred to as coupling capacitance), although in other examples, the drive and sense lines can be positioned in non-orthogonal arrangements. The drive lines 102 and sense lines 104 can cross over each other in different planes separated from one another by a dielectric. Each point in which a drive line 102 intersects a sense line 104 can create a touch node 106. Thus, for example, a panel which contains 20 drive lines 102 and 15 sense lines 104 will have 300 touch nodes available to detect touch or proximity events.

Drive lines 102 (also referred to as rows, row traces, or row electrodes) can be activated by a stimulation signal provided by respective drive circuits 108. Each of the drive circuits 108 can include an alternating current (AC) or unipolar pulsatile voltage source referred to as a stimulation signal source. To sense touch event(s) on the touch sensor panel 100, one or more of the drive lines 102 can be stimulated by the drive circuits 108, and the sense circuitry 110 can detect the resulting change in the charge coupled onto the sense lines 104 in the form of a change in the amplitude of the coupled stimulation signal. The change in voltage amplitude values can be indicative of a finger or conductive object touching or in proximity to the panel. The detected voltage values can be representative of node touch output values, with changes to those output values indicating the node locations 106 where the touch or proximity events occurred and the amount of touch that occurred at those location(s).

Figure 2:
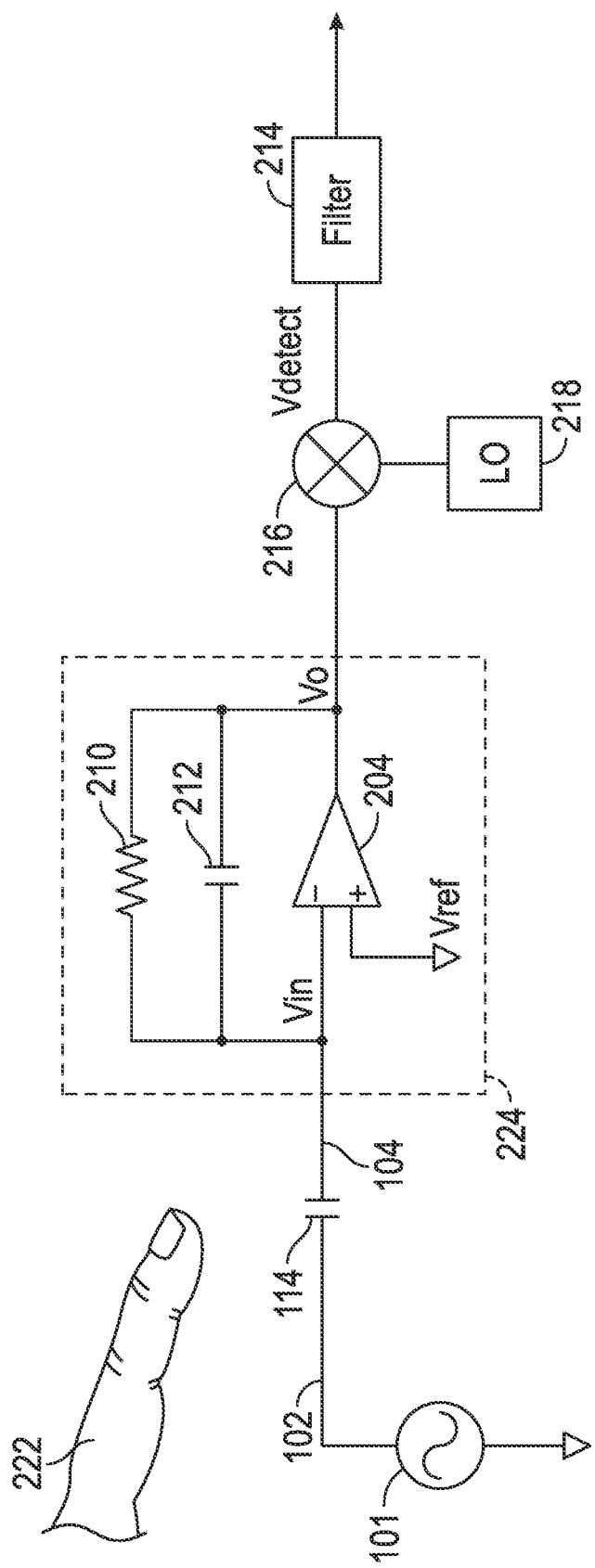
FIG. 2 illustrates an exemplary electrical circuit corresponding to a mutual-capacitance touch sensor sense line according to examples of the disclosure.

FIG. 2 illustrates an exemplary electrical circuit corresponding to a mutual-capacitance touch sensor sense line according to examples of the disclosure. Drive line 102 can be stimulated by stimulation signal 101. Stimulation signal 101 can be capacitively coupled to sense line 104 through the mutual capacitance 114 between drive line 102 and the sense line. When a finger or object 222 approaches the touch node created by the intersection of drive line 102 and sense line 104, the mutual capacitance 114 can be altered. This change in mutual capacitance 114 can be detected to indicate a touch or proximity event. The sense signal coupled onto sense line 104 is then received by sense amplifier 224. Sense amplifier 224 can include operational amplifier 204, and at least one of a feedback resistor 210 and a feedback capacitor 212. FIG. 2 is shown for the general case in which both resistive and capacitive feedback elements are utilized. The sense signal can be inputted into the inverting input (referred to as Vin) of the operational amplifier 204, and the non-inverting input can be tied to a reference voltage Vref 206. The operational amplifier 204 adjusts its output voltage to keep Vin equivalent to Vref and therefore keep Vin constant or virtually grounded as to reject stray capacitance Cs or any change thereof. Therefore, the gain of the amplifier is mostly a function of the ratio of the signal capacitance 114 and the feedback impedance, comprised of resistors 210 and capacitor 212. The output of sense amplifier 224 Vout can be further filtered and heterodyned or homodyned by being fed into a multiplier 216, and multiplied with a local oscillator 218 to produce Vdetect. One skilled in the art will recognize that the placement of filter 214 can be varied, and thus could be placed after multiplier 216, or two filters can be employed, one before the mixer and one after the mixer. In some examples, there can be no filter at all. The direct current (DC) portion of Vdetect can be used to detect if a touch or proximity event has occurred.

Figure 3:
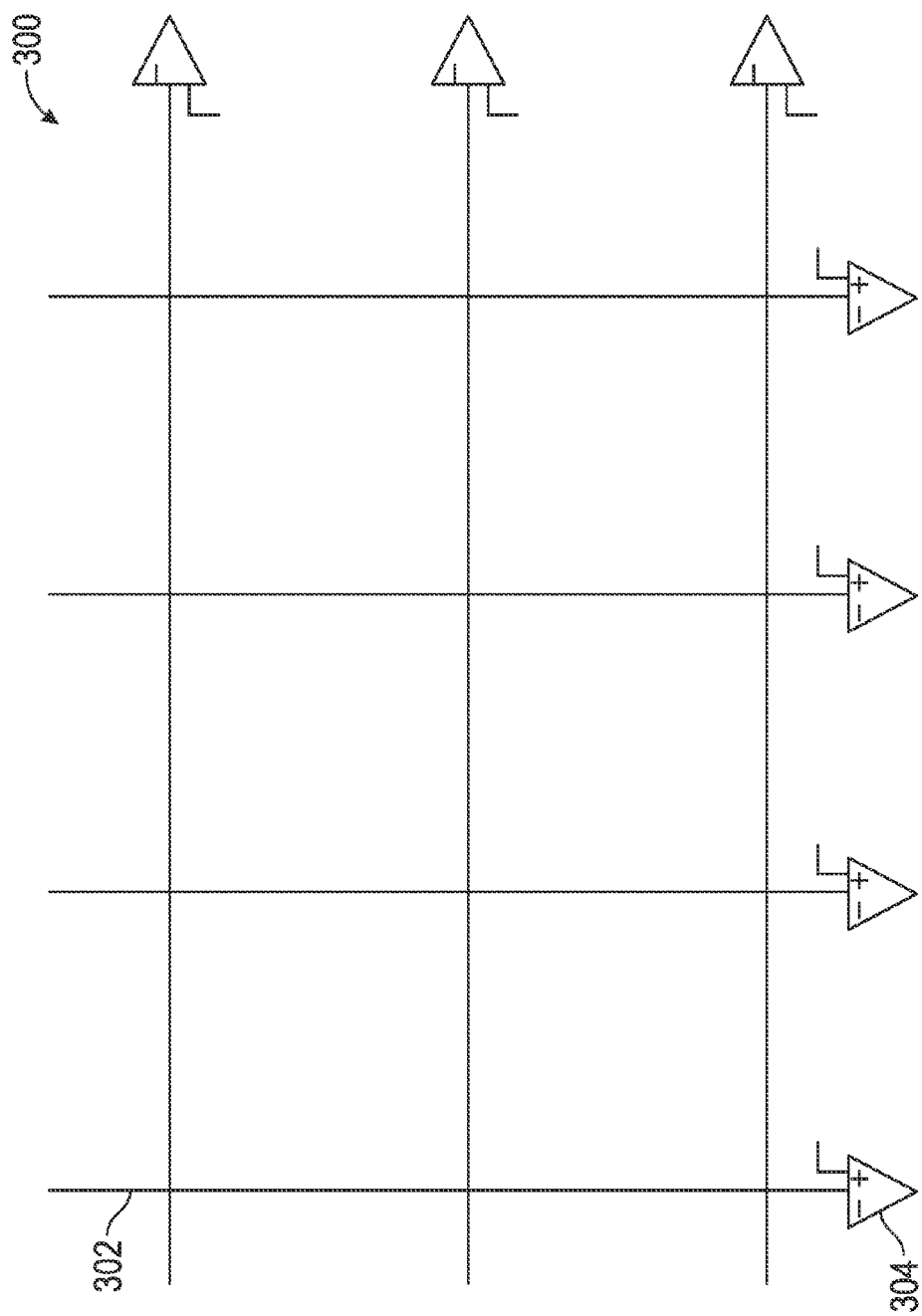
FIG. 3 illustrates an exemplary self-capacitance touch sensor circuit according to examples of the disclosure.

Touch sensor panels that employ self-capacitance to detect touch or proximity events can be used to detect the presence of a finger or object that is further away from the touch sensor panel than a panel which uses mutual capacitance. FIG. 3 illustrates an exemplary self-capacitance touch sensor circuit 300 according to examples of the disclosure. Self-capacitive touch sensor panel circuit 300 contains electrodes 302 which are connected to sense circuitry 304 and have a self-capacitance to ground. When an object touches or is in close proximity with the electrode, an additional capacitance can be formed between the electrode and ground through the object, which can increase the self-capacitance of the electrode. This change in the self-capacitance of an electrode 302 can be detected by sensing circuit 304. Changes in self-capacitance can be created when objects or fingers are further away from the touch panel, as opposed to mutual capacitance touch panels which require the finger or object to be either touching or in near proximity to the panel in order to sense a touch or proximity event. Unlike mutual capacitance touch sensor 100, each electrode of the circuit acts as a touch node, rather than the intersections of orthogonal electrodes. Thus in 20×15 electrode array, there are only 35 touch nodes.

Figure 4:
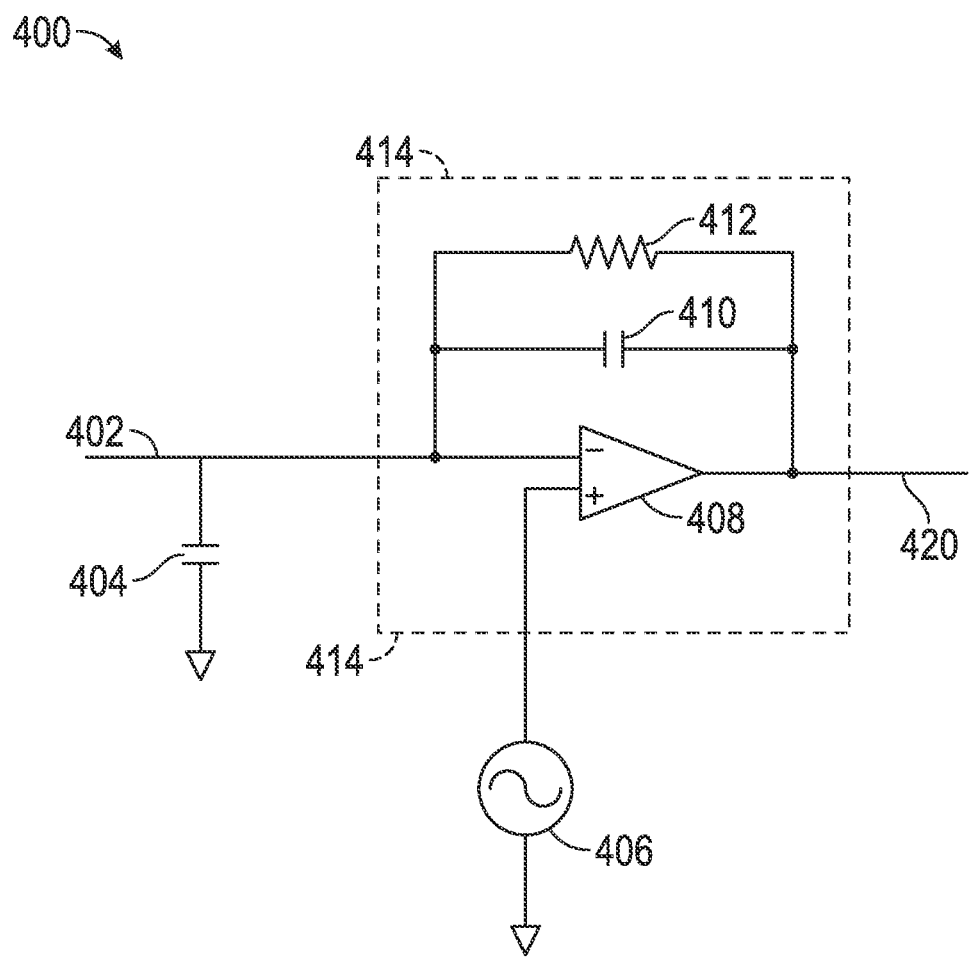
FIG. 4 illustrates an exemplary electrical circuit corresponding to a self-capacitance touch sensor electrode according to examples of the disclosure.

FIG. 4 illustrates an exemplary electrical circuit corresponding to a self-capacitance touch sensor electrode and sensing circuit according to examples of the disclosure. Electrode 402 can have a self-capacitance 404 to ground associated with it. Touch electrode 402 can be coupled to sensing circuit 414. Sensing circuit can include an operational amplifier 408, feedback resistor 412, feedback capacitor 410 and an input voltage source 406, although other configurations can be employed. For example, feedback resistor 412 can be replaced by a switched capacitor resistor in order to minimize any parasitic capacitance effect caused by a variable feedback resistor. The touch electrode can be coupled to the inverting input of operational amplifier 408. An AC voltage source 406 (Vac) can be coupled to the non-inverting input of operational amplifier 408. The touch sensor circuit 400 can be configured to sense changes in self-capacitance 404 induced by a finger or object either touching or in proximity to the touch sensor panel. The output 420 of the touch sense circuit 400 is used to determine the presence of a proximity event. The output 420 can either be used by a processor to determine the presence of a proximity or touch event, or output 420 can be inputted into a discrete logic network to determine the presence of a touch or proximity event.

As illustrated and discussed above, a mutual capacitive touch sensor panel can have sense circuitry that is similar to the sense circuitry of a self-capacitive touch sensor panel.

Both circuit topologies can contain an operational amplifier that utilizes a feedback capacitor and/or a feedback resistor to connect the inverting input of the operational amplifier to the output. The difference between the two configurations can be that the non-inverting input is connected to a reference voltage in a mutual capacitive mode, and is connected to a stimulation AC voltage during a self-capacitance mode. Also, in a self-capacitive mode, there may be no drive lines; rather, the column and row lines act as electrodes. In the case where a single touch sensor panel is to function as both a mutual capacitive touch sensor panel and a self-capacitive touch sensor panel, it may be advantageous to re-use circuit components that are common to both configurations for the purposes of lowering the complexity, weight and power of the touch sensitive device.

Figure 5:
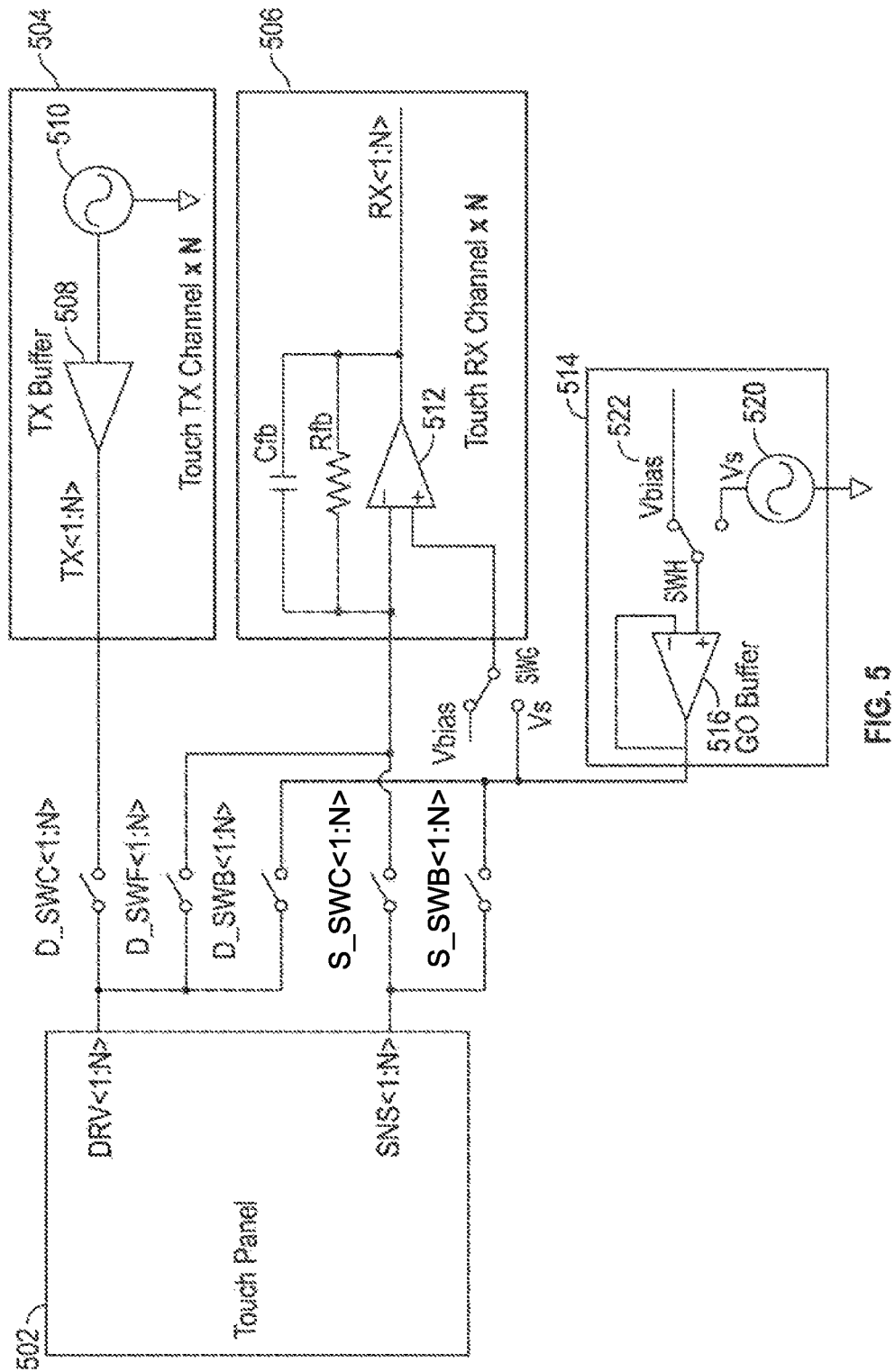
FIG. 5 illustrates a reconfigurable touch sensor panel that can switchably operate in both a mutual capacitive and self-capacitive mode.

FIG. 5 illustrates a reconfigurable touch sensor panel that can switchably operate in both a mutual capacitive and self-capacitive mode. The touch panel 502 can contain N drive lines (denoted in the figure as DRV<1:N> and N sense lines (denoted in the figure as SNS<1:N>. The example of FIG. 5 illustrates a touch panel that has an equal number of drive lines and sense lines, but the disclosure is not so limited. The number of drive lines and sense lines can be equal, or there can be more drive lines than sense lines and vice versa.

As illustrated in FIG. 5, each of the drive lines DRV <1:N> can be connected to a plurality of switches. The switches can be configured such that they can connect each drive line to various hardware components that may be necessary for the touch sensor panel to operate in a mutual capacitance or self-capacitance mode. For example, the drive lines DRV<1:N> can each be connected to a touch transmit channel 504 via switches D_SWC<1:N>. There can be N number of transmit channels 504 such that each individual drive line can connect to its own separate touch transmit channel. The touch transmit channel can include a stimulation voltage source 510 and a transmit buffer 508 which together can provide a stimulation signal to the drive lines when the touch sensor panel 502 is configured to operate in a mutual capacitance mode.

Each of the drive lines DRV <1:N> can also be connected to a touch receive channel 506 via switches D_SWF<1:N>. There can be N number of touch receive channels 506 such that each drive line can connect to its own touch receive channel. The touch receive channels 506 can include an operational amplifier 512 that can be configured with a feedback resistor $R_{fb}$ and/or a feedback capacitor $C_{fb}$ as described above. The operational amplifier can be switchably configured via switch SWG to have its non-inverting input either connected to a reference voltage $V_{bias}$ or a stimulation voltage $V_s$. The operational amplifier 512 can be connected to $V_{bias}$ during a mutual capacitive mode, and can be connected to $V_s$ during a self-capacitive mode. The drive lines DRV<1:N> can be connected to the touch receive channels so that each drive line can act as a sense electrode when the touch sensor panel 502 is configured to operate in a self-capacitance mode.

Each of the drive lines DRV<1:N> can also be connected to a voltage buffer circuit 514 via switches D_SWB<1:N>. There can be N number of voltage buffer circuits 514 such that each drive line can connect to its own voltage buffer circuit. The voltage buffer circuit 514 can include an operational amplifier 516 that can be configured to act as a buffer for a voltage source. The operational amplifier 516 can be switchably configured to be connected to a DC bias voltage (Vbias) or a stimulation voltage Vs via switch SWH. The drive lines DRV<1:N> can be connected to the voltage buffer circuit 514 in order to provide shielding or DC biasing to the drive lines as will be described below.

As illustrated in FIG. 5, each of the sense lines SNS<1:N> can be connected to a plurality of switches. The switches can be configured such that they connect each sense line to various hardware components that may be necessary for the touch sensor panel to operate in a mutual capacitance or self-capacitance mode. For instance, each of the sense lines SNS<1:N> be connected to touch receive channels 506 via switches S_SWC<1:N>. There can be N number of touch receive channels 506 such that each sense line can connect to its own touch receive channel. The sense lines SNS<1:N> can be connected to the touch receive channels so that each sense line can act as a sense electrode when the touch sensor panel 502 is configured to operate in a self-capacitance mode and as a sense line in a mutual capacitance mode according to the examples discussed above.

Each of the sense lines SNS<1:N> can also be connected to a voltage buffer circuit 514 via switches S_SWB<1:N>. There can be N number of voltage buffer circuits 514 such that each sense line can connect to its own voltage buffer circuit. The sense lines SNS<1:N> can be connected to the voltage buffer circuit 514 in order to provide shielding or DC biasing to the drive lines as will be described below.

Figure 6:
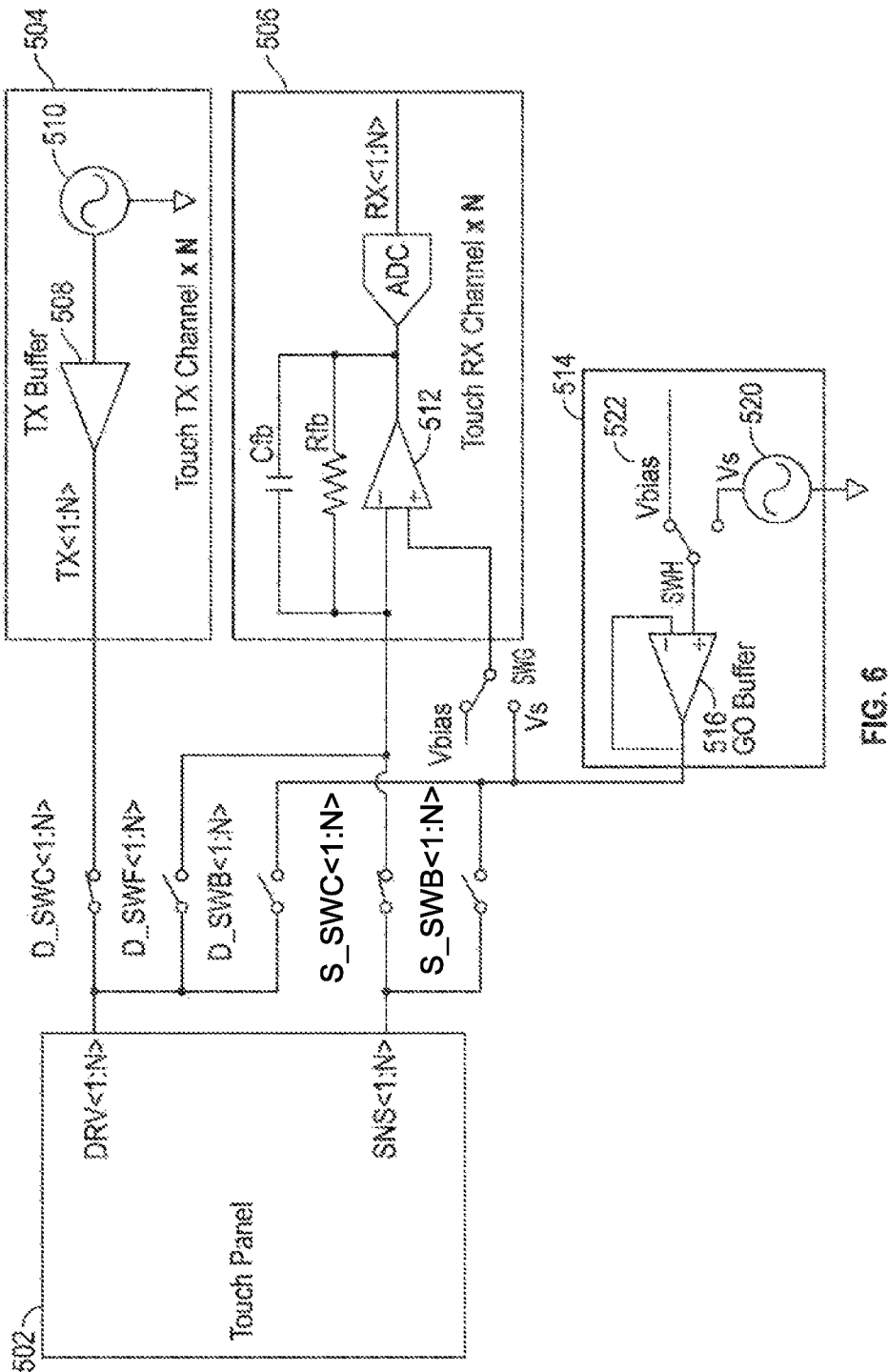
FIG. 6 illustrates the reconfigurable touch sensor panel of FIG. 5 in a mutual capacitance sensing configuration according to examples of the disclosure.

FIG. 6 illustrates the reconfigurable touch sensor panel of FIG. 5 in a mutual capacitance sensing configuration according to examples of the disclosure. In the mutual capacitance configuration, the drive lines DRV<1:N> can each be connected to a touch transmit channel 504 by closing switches D_SWC<1:N>. The sense lines SNS<1:N> can each be connected to a touch receive channel 506 by closing switches S_SWC<1:N>. In accordance with the description of a mutual capacitance touch sense circuit above, the operational amplifiers 512 can be connected to $V_{bias}$ via switch SWG. The remaining switches described in FIG. 5 can be left open.

To operate the touch sensor panel in a self-capacitance mode, each drive line and each sense line can be configured to operate as a sense electrode. As described above, in a self-capacitance mode each drive line and each sense line can be connected via switches to a touch receive channel 506. This can mean that in a touch sensor panel that has N rows and N columns, 2×N touch receive channels can be utilized to operate the touch sensor panel in a self-capacitance mode. In contrast, during a mutual capacitance mode as described above, only N touch receive channels connected to the sense lines would be necessary. In a touch sensor panel that can alternately operate as a mutual capacitive touch sensor panel and a self-capacitive touch sensor panel, that could mean that during a mutual capacitance mode only N touch receive channels are being utilized, while another N touch channels that would only be used in a self-capacitance mode are not being utilized. In some examples, in order to more efficiently utilize touch receive channels, a self-capacitive touch mode can be split into two steps. In the first step, the drive lines can be configured to operate as self-capacitive electrodes while the sense electrodes are not utilized. In the second step, the sense lines can be configured to operate as self-capacitive electrodes while the drive lines are not utilized. In this way, only N touch receive channels are needed to operate the panel in a self-capacitive mode rather than 2×N.

Figure 7:
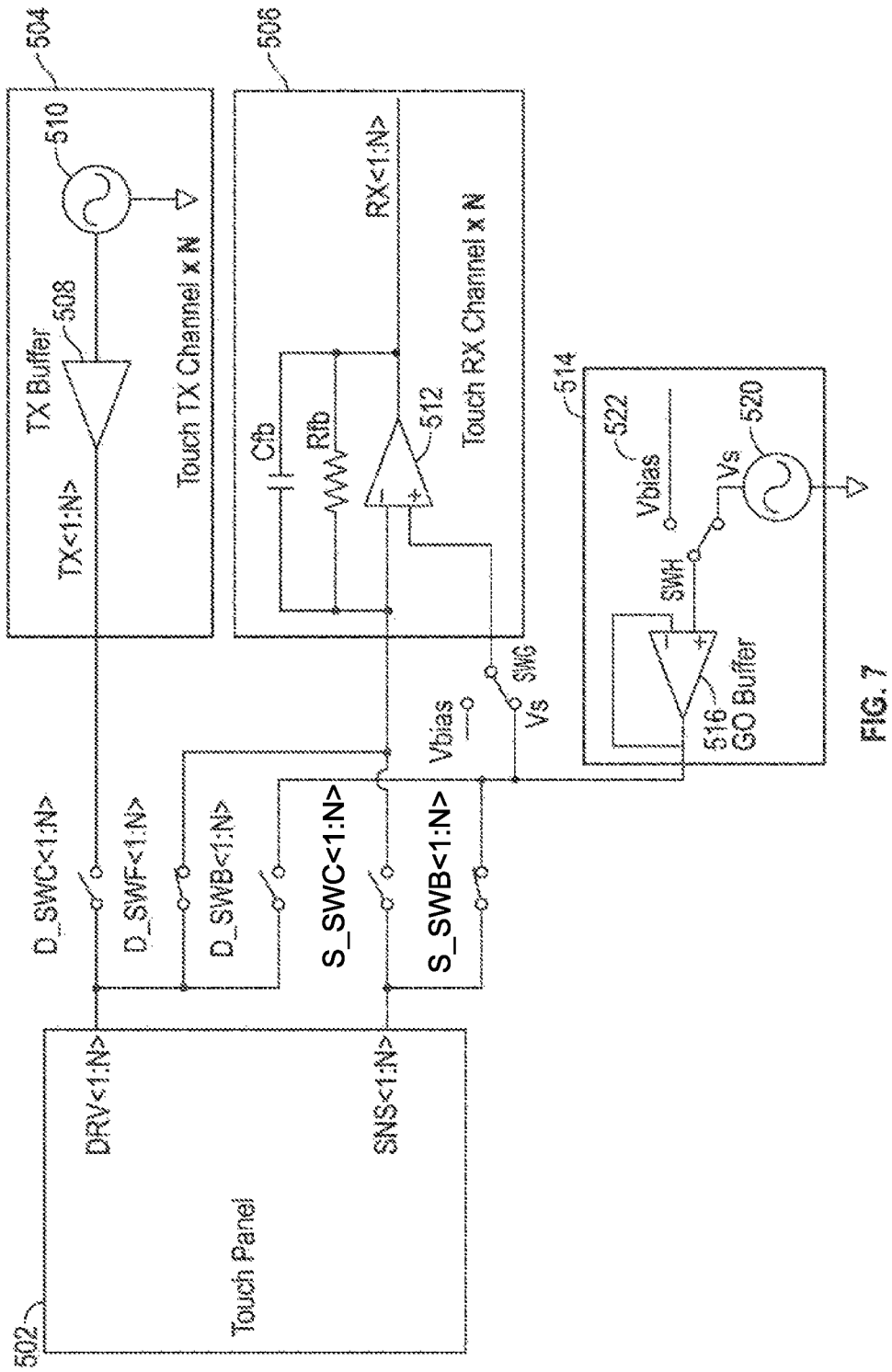
FIG. 7 illustrates the reconfigurable touch sensor panel of FIG. 5 in a drive line self-capacitance sensing configuration according to examples of the disclosure.

FIG. 7 illustrates the reconfigurable touch sensor panel of FIG. 5 in a drive line self-capacitance sensing configuration according to examples of the disclosure. In the drive line self-capacitance sensing configuration, the drive lines DRV<1:N> can each be connected to a touch receive channel 506 by closing switches D_SWF<1:N>. The touch receive channels can be configured to operate in a self-capacitive mode by configuring switch SWG to connect the non-inverting input of the operational amplifier 512 to the voltage buffer circuit 514. The voltage buffer circuit 514 can be connected to a stimulation voltage source Vs via switch SWH.

While the drive lines DRV<1:N> are configured to operate as self-capacitive touch electrodes, the sense lines can be left to float by leaving switches S_SWC and S_SWB open. However, in some examples of a touch sensor panel, by leaving the sense lines floating, they may capacitively couple parasitic noise into the drive lines due to their proximity to the drive lines. For instance, noise from the display electronics can be coupled into the sense lines and in turn to the drive lines. This may lead to a degradation in the signal to noise ratio during self-capacitive touch detection. To mitigate the effects of parasitic capacitance, during a drive line self-capacitive mode, the sense lines SNS<1:N> can also be coupled to a voltage buffer circuit 514 rather than left to float. This can be done by closing the switch S_SWB<1:N>. By having the sense lines configured to be connected to the same voltage source that is be used to stimulate the drive lines for touch sensing, the sense lines can act as a driven shield, protecting the drive lines from parasitic capacitance sources.

Figure 8:
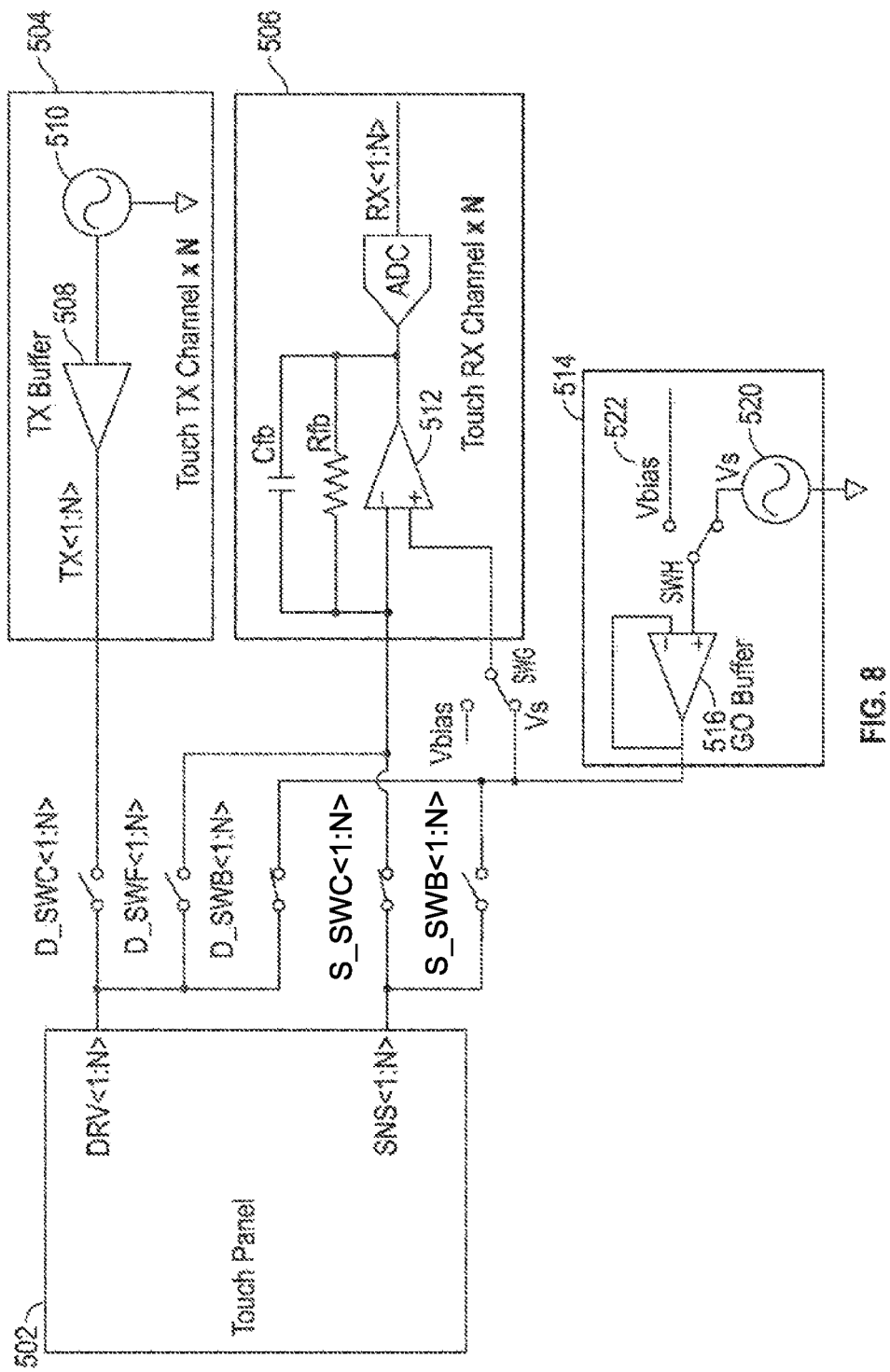
FIG. 8 illustrates the reconfigurable touch sensor panel of FIG. 5 in a sense line self-capacitance sensing configuration according to examples of the disclosure.

FIG. 8 illustrates the reconfigurable touch sensor panel of FIG. 5 in a sense line self-capacitance sensing configuration according to examples of the disclosure. In the sense line self-capacitance sensing configuration, the sense lines SNS <1:N> can each be connected to a touch receive channel 506 by closing switches S_SWC<1:N>. The touch receive channels can be configured to operate in a self-capacitive mode by configuring switch SWG to connect the non-inverting input of the operational amplifier 512 to the voltage buffer circuit 514. The voltage buffer circuit 514 can be connected to a stimulation voltage source Vs via switch SWH.

While the sense lines SNS <1:N> are configured to operate as self-capacitive touch electrodes, the drive lines can be left to float by leaving switches D_SWC, D_SWF and D_SWB open. However, in some examples of a touch sensor panel, by leaving the drive lines floating, they may capacitively couple parasitic noise into the sense lines due to their proximity to the drive lines. For instance, noise from the display electronics can be coupled into the drive lines and in turn to the sense lines. This may lead to a degradation in the signal to noise ratio during self-capacitive touch detection. To mitigate the effects of parasitic capacitance, during a sense line self-capacitive mode, the drive lines DRV<1:N> can also be coupled to a voltage buffer circuit 514 rather than left to float. This can be done by closing the switch D_SWB<1:N>. By having the drive lines configured to be connected to the same voltage source that is be used to stimulate the sense lines for touch sensing, the drive lines can act as a driven shield, protecting the drive lines from parasitic capacitance sources.

Figure 9:
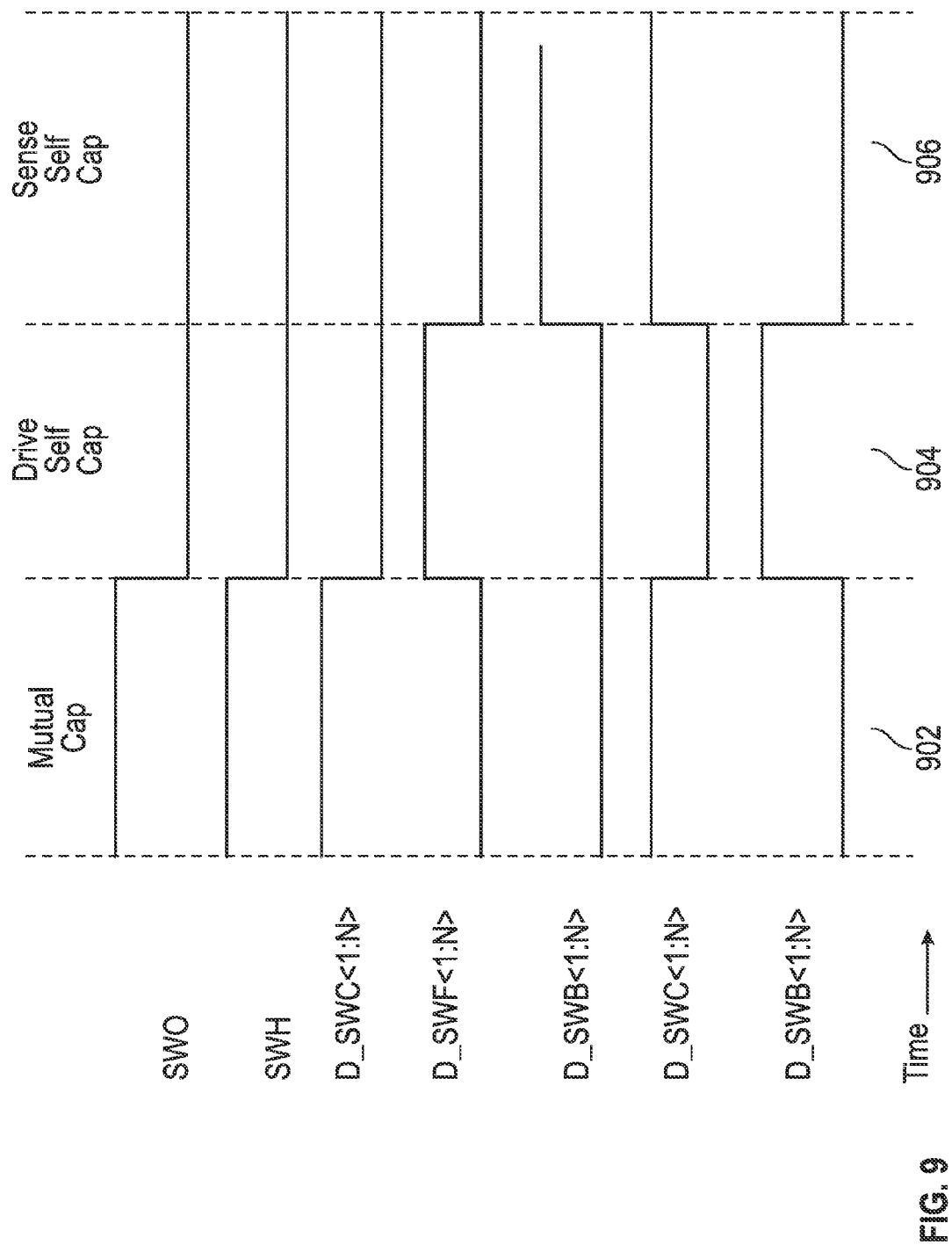
FIG. 9 illustrates an exemplary switch timing diagram for a touch sensor panel that can switchably operate in a mutual capacitive and self-capacitive mode according to examples of the disclosure.

FIG. 9 illustrates an exemplary switch timing diagram for a touch sensor panel that can switchably operate in a mutual capacitive and self-capacitive mode according to examples of the disclosure. During a touch sensing mode, the touch sensing panel can time interleave the mutual capacitive, drive line self-capacitive, and sense line self-capacitive sense modes by operating the switches as described above. In one example, the touch sensor panel can first operate in a mutual capacitance mode, then switch to a drive line self-capacitance mode and then finally switch to a sense line self-capacitance mode. The touch sensor senor panel can repeat this time interleaving for as long as the touch sensitive device is in a touch or proximity event detection mode. The timing diagram of FIG. 9 illustrates the state of each switch discussed in FIG. 5 during each of the modes of touch detection, mutual capacitive mode, drive line self-capacitive mode and sense line self-capacitive mode.

During a mutual capacitance mode 902, switches SWG, SWH, D_SWC<1:N> and S_SWC<1:N> can be closed while the other switches are left open (in the timing diagram example of FIG. 9, a switch being asserted, i.e., high voltage, indicates that it is closed). Next, the device can enter a drive line self-capacitance mode 904. To switch the mode, both SWG and SWH can be switched to connect the stimulation sources as described above. D_SWC<1:N> and S_SWC<1:N> can be opened, while D_SWF<1:N> and S<1:N> can be closed. The remaining switches can maintain their position. Next, the device can enter a sense line self-capacitance mode 906. To switch the mode, D_SWF<1: N> and S_SWB<1:N> can be opened, while D_SWB<1:N> and S_SWC<1:N> are closed. The remaining switches can maintain their position. The timing diagram above can be repeated for as long as the device in which the touch sensor panel resides is detecting touch and proximity events. While the timing diagram of FIG. 9 illustrates that each mode is of equal duration, the disclosure is not so limited. In some examples, the mutual capacitive mode can be longer than both the drive-line self-capacitive mode and the sense line self-capacitive mode.

Figure 10:
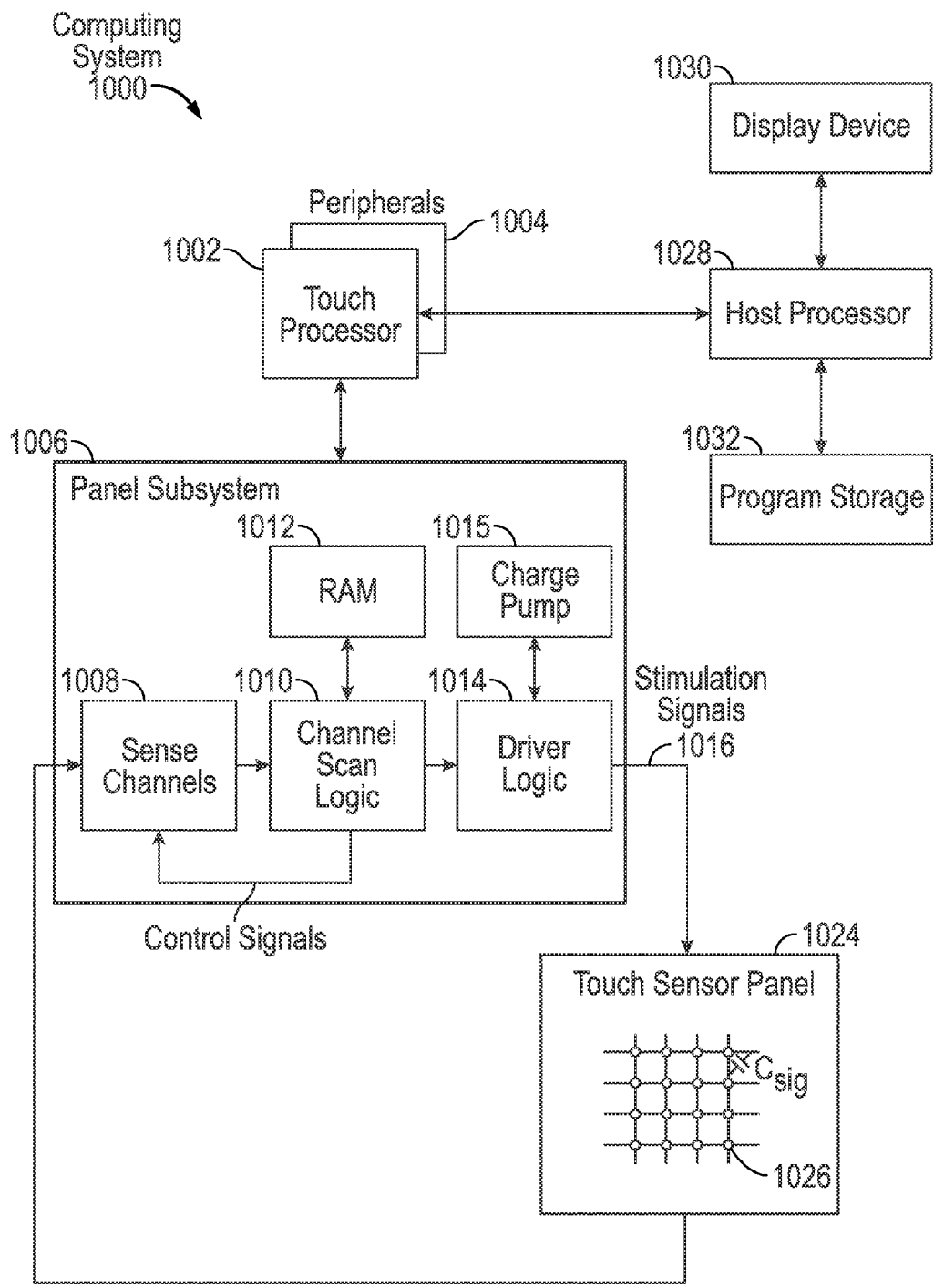
FIG. 10 illustrates an exemplary computing system including a touch sensor panel utilizing touch sensor common mode noise recovery according to examples of the disclosure.

FIG. 10 illustrates exemplary computing system 1000 that can include one or more of the examples described above. Computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008 which can utilize operational amplifiers that can be configured to minimize saturation time, channel scan logic 1010 and driver logic 1014. Channel scan logic 1010 can access RAM 1012, autonomously read data from the sense channels and provide control for the sense channels. In addition, channel scan logic 1010 can control driver logic 1014 to generate stimulation signals 1016 at various frequencies and phases that can be selectively applied to drive lines of touch sensor panel 1024. In some examples, panel subsystem 1006, panel processor 1002 and peripherals 1004 can be integrated into a single application specific integrated circuit (ASIC).

Touch sensor panel 1024 can include a capacitive sensing medium having a plurality of drive lines and a plurality of sense lines, although other sensing media can also be used. Each intersection of drive and sense lines can represent a capacitive sensing node and can be viewed as picture element (node) 1026, which can be particularly useful when touch sensor panel 1024 is viewed as capturing an "image" of touch. Each sense line of touch sensor panel 1024 can drive sense channel 1008 (also referred to herein as an event detection and demodulation circuit) in panel subsystem 1006. The drive and sense lines can also be configured to act as individual electrodes in a self-capacitance touch sensing configuration.

Computing system 1000 can also include host processor 1028 for receiving outputs from panel processor 1002 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and display device 11130 such as an LCD display for providing a UI to a user of the device. Display device 11130 together with touch sensor panel 1024, when located partially or entirely under the touch sensor panel, can form touch screen 1018.

Note that one or more of the functions described above, including the configuration of switches, can be performed by firmware stored in memory (e.g. one of the peripherals 1004 in FIG. 10) and executed by panel processor 1002, or stored in program storage 1032 and executed by host processor 1028. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 11A:
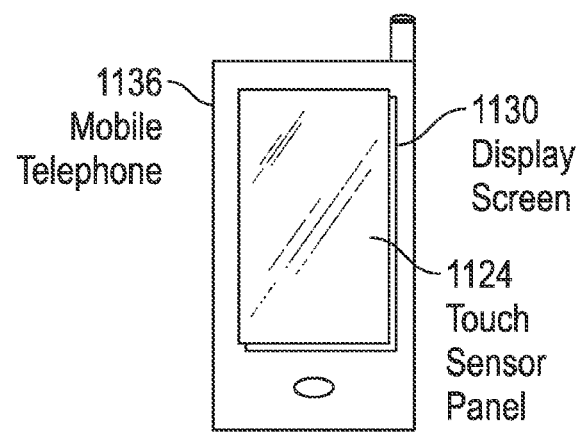
FIG. 11a illustrates an exemplary mobile telephone having a touch sensor panel that includes a touch common mode noise recovery circuit and method according to examples of the disclosure.

FIG. 11*a* illustrates exemplary mobile telephone 1136 that can include touch sensor panel 1124 and display device 1130, the touch sensor panel including circuitry to change the configuration of the touch sensor panel between a mutual capacitive, drive line self-capacitive and sense line self-capacitive configuration according to examples of the disclosure.

Figure 11B:
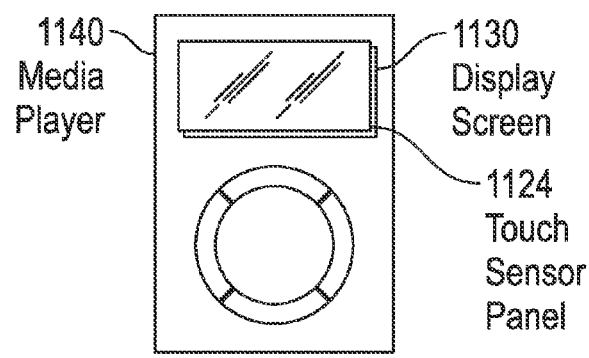
FIG. 11b illustrates an exemplary digital media player having a touch sensor panel that includes a touch common mode noise recovery circuit and method according to examples of the disclosure.

FIG. 11*b* illustrates exemplary digital media player 1140 that can include touch sensor panel 1124 and display device 1130, the touch sensor panel including circuitry to change the configuration of the touch sensor panel between a mutual capacitive, drive line self-capacitive and sense line self-capacitive configuration according to examples of the disclosure.

Figure 11C:
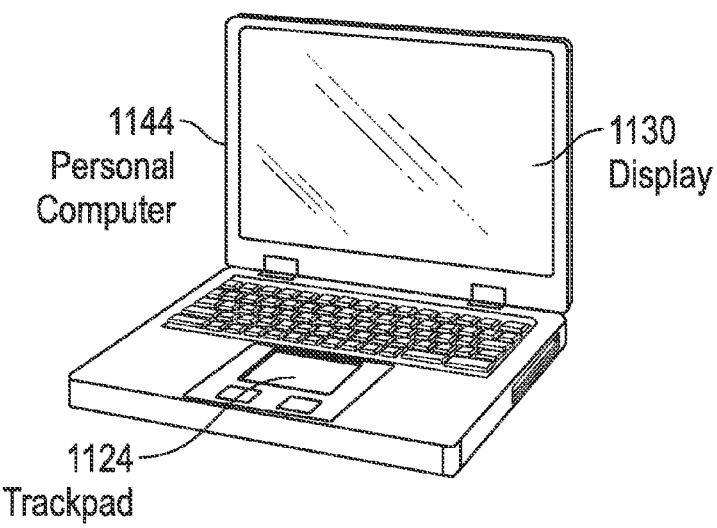
FIG. 11c illustrates an exemplary personal computer having a touch sensor panel that includes a touch common mode noise recovery circuit and method according to examples of the disclosure.

FIG. 11*c* illustrates exemplary personal computer 1144 that can include touch sensor panel (trackpad) 1124 and display 1130, the touch sensor panel including circuitry to change the configuration of the touch sensor panel between a mutual capacitive, drive line self-capacitive and sense line self-capacitive configuration according to examples of the disclosure.

Although FIGS. 11*a-c* discuss a mobile telephone, a media player and a personal computer respectively, the disclosure is not so restricted and the touch sensor panel can be included on a tablet computer, a television, or any other device which utilizes the touch sensor panel including circuitry to switch between near field far field sensing configurations and mitigate the effects of parasitic capacitance on the touch sensor panel.

Therefore, according to the above, some examples of the disclosure are directed to a method for switchably operating a touch sensor panel in a self-capacitance touch detection mode and a mutual capacitance touch detection mode, the method comprising: configuring a first set of multiple lines as sense electrodes in a drive line self-capacitance configuration, and as drive lines in a mutual capacitance configuration; and configuring a second set of multiple lines as sense electrodes in a sense line self-capacitance configuration and a mutual capacitance configuration. Additionally or alternatively to one or more examples disclosed above, configuring the first set of multiple lines as drive lines comprises coupling one or more stimulation sources to the first set of multiple lines. Additionally or alternatively to one or more examples disclosed above, configuring the first set and the second set of multiple lines as sense electrodes comprises coupling a set of sensing circuits to the first set and the second set of multiple lines. Additionally or alternatively to one or more examples disclosed above, the sensing circuitry used to configure the first set of multiple lines as sense electrodes is the same sensing circuitry used to configure the second set of multiple lines as sense electrodes. Additionally or alternatively to one or more examples disclosed above, the sensing circuitry is connected to a DC voltage source during the mutual capacitance configuration and to an AC voltage during both the drive line and sense line self-capacitance configuration. Additionally or alternatively to one or more examples disclosed above, the method further comprising: configuring the first set of multiples lines to be connected to a voltage source during a sense line self-capacitance mode; and configuring the second set of multiple lines to be connected to the voltage source during a drive line self-capacitance mode. Additionally or alternatively to one or more examples disclosed above, the voltage source produces a signal having substantially the same frequency and phase as a stimulation signal used during both the drive line and sense line self-capacitance modes. Additionally or alternatively to one or more examples disclosed above, the voltage source is also used to stimulate the first set of multiple lines during the drive line self-capacitance configuration and to stimulate the second set of multiple lines during the sense line self-capacitance configuration.

Other examples of the disclosure are directed to a touch sensitive device capable of operating in both a self-capacitance and mutual capacitance touch detection mode, the device comprising: a touch sensor panel, the touch sensor panel including both a first set of multiple lines and a second set of multiple lines; switching circuitry coupled to both the first set of multiple lines and the second set of multiples; and a processor capable of: configuring a first set of multiple lines as sense electrodes in a drive line self-capacitance configuration, and as drive lines in a mutual capacitance configuration; and configuring a second set of multiple lines as sense electrodes in a sense line self-capacitance configuration and a mutual capacitance configuration. Additionally or alternatively to one or more examples disclosed above, configuring the first set of multiple lines as drive lines comprises coupling one or more stimulation sources to the first set of multiple lines. Additionally or alternatively to one or more examples disclosed above, configuring the first set and second set of multiple lines as sense electrodes comprises coupling a set of sensing circuits to the first and second set of multiple lines. Additionally or alternatively to one or more examples disclosed above, the sensing circuitry used to configure the first set of multiple lines as sense electrodes is the same sensing circuitry used to configure the second set of multiple lines as sense electrodes. Additionally or alternatively to one or more examples disclosed above, the sensing circuitry is connected to a DC voltage source during the mutual capacitance configuration and to an AC voltage during both the drive line and sense line self-capacitance configuration. Additionally or alternatively to one or more examples disclosed above, the processor is further capable of: configuring the first set of multiples lines to be connected to a voltage source during a sense line self-capacitance mode; and configuring the second set of multiple lines to be connected to the voltage source during a drive line self-capacitance mode. Additionally or alternatively to one or more examples disclosed above, the voltage source produces a signal having substantially the same frequency and phase as a stimulation signal used during both the drive line and sense line self-capacitance modes. Additionally or alternatively to one or more examples disclosed above, the voltage source is also used to stimulate the first set of multiple lines during the drive line self-capacitance configuration and to stimulate the second set of multiple lines during the sense line self-capacitance configuration.

Other examples of the disclosure are directed to a non-transitory computer readable storage medium having stored thereon a set of instructions for switching a touch sensor panel between a self-capacitance mode and a mutual capacitance mode, that when executed by a processor causes the processor to: configure a first set of multiple lines as sense electrodes in a drive line self-capacitance configuration, and as drive lines in a mutual capacitance configuration; and configure a second set of multiple lines as sense electrodes in a sense line self-capacitance configuration and a mutual capacitance configuration. Additionally or alternatively to one or more examples disclosed above, configuring the first set of multiple lines as drive lines comprises coupling one or more stimulation sources to the first set of multiple lines. Additionally or alternatively to one or more examples disclosed above, configuring the first set and second set of multiple lines as sense electrodes comprises coupling a set of sensing circuits to the first and second set of multiple lines. Additionally or alternatively to one or more examples disclosed above, the sensing circuitry used to configure the first set of multiple lines as sense electrodes is the same sensing circuitry used to configure the second set of multiple lines as sense electrodes. Additionally or alternatively to one or more examples disclosed above, the sensing circuitry is connected to a DC voltage source during the mutual capacitance configuration and to an AC voltage during both the drive line and sense line self-capacitance configuration. Additionally or alternatively to one or more examples disclosed above, the processor is further caused to: configure the first set of multiples lines to be connected to a voltage source during a sense line self-capacitance mode; and configure the second set of multiple lines to be connected to the voltage source during a drive line self-capacitance mode. Additionally or alternatively to one or more examples disclosed above, the voltage source produces a signal having substantially the same frequency and phase as a stimulation signal used during both the drive line and sense line self-capacitance modes. Additionally or alternatively to one or more examples disclosed above, the voltage source is also used to stimulate the first set of multiple lines during the drive line self-capacitance configuration and to stimulate the second set of multiple lines during the sense line self-capacitance configuration.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for switchably operating a touch sensor panel in a self-capacitance mode and a mutual capacitance mode, the method comprising:
   in the mutual capacitance mode:
      configuring a first set of multiple lines as drive lines in a mutual capacitance configuration;
      configuring a second set of multiple lines as sense lines in the mutual capacitance configuration; and
      uncoupling the first set of multiple lines and the second set of multiple lines from a shield buffer and coupling an input of the shield buffer to a reference voltage; and
   in the self-capacitance mode:
      configuring the first set of multiple lines as sense electrodes in a self-capacitance configuration;
      uncoupling the second set of multiple lines from a sense amplifier;
      coupling the second set of multiple lines to a shield buffer and coupling the input of the shield buffer to a shield voltage, different from the reference voltage;
      coupling the first set of multiple lines with the sense amplifier;
      configuring the second set of multiple lines as sense electrodes in the self-capacitance configuration;
      uncoupling the first set of multiple lines from the sense amplifier;
      coupling the first set of multiple lines to a shield buffer and coupling the input of the shield buffer to the shield voltage; and
      coupling the second set of multiple lines with the sense amplifier.

2. The method of claim 1, wherein configuring the first set of multiple lines as drive lines comprises coupling one or more stimulation sources to the first set of multiple lines.

3. The method of claim 1, wherein configuring the first set and the second set of multiple lines as sense electrodes comprises coupling a set of sensing circuits to the first set and the second set of multiple lines.

4. The method of claim 3, wherein the sensing circuitry used to configure the first set of multiple lines as sense electrodes is the same sensing circuitry used to configure the second set of multiple lines as sense electrodes.

5. The method of claim 3, wherein the sensing circuitry is connected to a DC voltage source during the mutual capacitance mode and to an AC voltage source during the self-capacitance mode.

6. The method of claim 1 further comprising:
configuring the first set of multiples lines to be connected to a voltage source while sensing the second set of multiple lines; and
configuring the second set of multiple lines to be connected to the voltage source while sensing the first set of multiple lines.

7. The method of claim 6, wherein the voltage source produces a signal having substantially the same frequency and phase as a stimulation signal used to sense the first set of multiple lines and the second set of multiple lines.

8. The method of claim 7, wherein the voltage source is also used to stimulate the first set of multiple lines while sensing the first set of multiple lines and to stimulate the second set of multiple lines while sensing the second set of multiple lines.

9. The method of claim 1, further comprising switchably coupling an input of the sense amplifier to a first line of the first set of multiple lines and to a second line of the second set of multiple lines.

10. A touch sensitive device capable of operating in both a self-capacitance and a mutual capacitance mode, the device comprising:
a touch sensor panel, the touch sensor panel including both a first set of multiple lines and a second set of multiple lines;
switching circuitry coupled to both the first set of multiple lines and the second set of multiple lines;
a sense amplifier; and
a processor capable of:
  in the mutual capacitance mode:
    configuring the first set of multiple lines as drive lines in a mutual capacitance configuration; and
    configuring the second set of multiple lines as sense lines in the mutual capacitance configuration; and
    uncoupling the first set of multiple lines and the second set of multiple lines from a shield buffer and coupling an input of the shield buffer to a reference voltage; and
  in the self-capacitance mode:
    configuring the first set of multiple lines as sense electrodes in a self-capacitance configuration;
    uncoupling the second set of multiple lines from the sense amplifier;
    coupling the second set of multiple lines to a shield buffer and coupling the input of the shield buffer to a shield voltage, different from the reference voltage;
    coupling the sense amplifier with the first set of multiple lines;
    configuring the second set of multiple lines as sense electrodes in the self-capacitance configuration;
    uncoupling the first set of multiple lines from the sense amplifier;
    coupling the first set of multiple lines to a shield buffer and coupling the input of the shield buffer to the shield voltage; and
    coupling the sense amplifier with the second set of multiple lines.

11. The device of claim 10, wherein configuring the first set of multiple lines as drive lines comprises coupling one or more stimulation sources to the first set of multiple lines.

12. The device of claim 10, wherein configuring the first set and second set of multiple lines as sense electrodes comprises coupling a set of sensing circuits to the first and second sets of multiple lines.

13. The device of claim 12, wherein the sensing circuitry used to configure the first set of multiple lines as sense electrodes is the same sensing circuitry used to configure the second set of multiple lines as sense electrodes.

14. The device of claim 12, wherein the sensing circuitry is connected to a DC voltage source during the mutual capacitance mode and to an AC voltage source the self-capacitance mode.

15. The device of claim 10, wherein the processor is further capable of:
configuring the first set of multiples lines to be connected to a voltage source while sensing the second set of multiple lines; and
configuring the second set of multiple lines to be connected to the voltage source while sensing the first set of multiple lines.

16. The device of claim 15, wherein the voltage source produces a signal having substantially the same frequency and phase as a stimulation signal used to sense the first set of multiple lines and the second set of multiple lines.

17. The device of claim 16, wherein the voltage source is also used to stimulate the first set of multiple lines while sensing the first set of multiple lines and to stimulate the second set of multiple lines while sensing the second set of multiple lines.

18. The device of claim 10, wherein the sense amplifier comprises an input switchably coupled to a first line of the first set of multiple lines and to a second line of the second set of multiple lines.

19. A non-transitory computer readable storage medium having stored thereon a set of instructions for switching a touch sensor panel between a self-capacitance mode and a mutual capacitance mode, that when executed by a processor causes the processor to:
in the mutual capacitance mode:
  configure a first set of multiple lines as drive lines in a mutual capacitance configuration; and
  uncoupling the first set of multiple lines and the second set of multiple lines from a shield buffer and coupling an input of the shield buffer to a reference voltage; and
  configure a second set of multiple lines as sense lines in the mutual capacitance configuration; and
in the self-capacitance mode:
  configure the first set of multiple lines as sense electrodes in a self-capacitance configuration;
  uncouple the second set of multiple lines from a sense amplifier;
  coupling the second set of multiple lines to a shield buffer and coupling the input of the shield buffer to a shield voltage, different from the reference voltage;
  couple the first set of multiple lines with the sense amplifier;
  configure the second set of multiple lines as sense electrodes in the self-capacitance configuration;
  uncouple the first set of multiple lines from the sense amplifier;
  coupling the first set of multiple lines to a shield buffer and coupling the input of the shield buffer to the shield voltage; and
  couple the second set of multiple lines with the sense amplifier.

20. The non-transitory computer readable storage medium of claim 19, wherein configuring the first set of multiple lines as drive lines comprises coupling one or more stimulation sources to the first set of multiple lines.

21. The non-transitory computer readable storage medium of claim 19, wherein configuring the first set and second set of multiple lines as sense electrodes comprises coupling a set of sensing circuits to the first and second set of multiple lines.

22. The non-transitory computer readable storage medium of claim 21, wherein the sensing circuitry used to configure the first set of multiple lines as sense electrodes is the same sensing circuitry used to configure the second set of multiple lines as sense electrodes.

23. The non-transitory computer readable storage medium of claim 21, wherein the sensing circuitry is connected to a DC voltage source during the mutual capacitance mode and to an AC voltage source during the self-capacitance mode.

24. The non-transitory computer readable storage medium of claim 19, wherein the processor is further caused to:

configure the first set of multiples lines to be connected to a voltage source while sensing the second set of multiple lines; and configure the second set of multiple lines to be connected to the voltage source while sensing the first set of multiple lines.

25. The non-transitory computer readable storage medium of claim 24, wherein the voltage source produces a signal having substantially the same frequency and phase as a stimulation signal used to sense the first set of multiple lines and the second set of multiple lines.

26. The non-transitory computer readable storage medium of claim 25, wherein the voltage source is also used to stimulate the first set of multiple lines while sensing the first set of multiple lines and to stimulate the second set of multiple lines while sensing the second set of multiple lines.

27. The non-transitory computer readable storage medium of claim 19, wherein the processor is further capable of switchably coupling an input of the sense amplifier to a first line of the first set of multiple lines and to a second line of the second set of multiple lines.

* * * * *